United States Patent
Brilliant et al.

(10) Patent No.: US 11,346,328 B2
(45) Date of Patent: May 31, 2022

(54) WIND TURBINE ROTOR BLADE LIGHTNING RECEPTOR ARRANGEMENT

(71) Applicant: Vestas Wind Systems A/S, Aarhus N. (DK)

(72) Inventors: Nathan A. Brilliant, Arvada, CO (US); Chris Sutton, Romsey (GB)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 16/640,936

(22) PCT Filed: Aug. 21, 2018

(86) PCT No.: PCT/DK2018/050205
§ 371 (c)(1),
(2) Date: Feb. 21, 2020

(87) PCT Pub. No.: WO2019/037826
PCT Pub. Date: Feb. 28, 2019

(65) Prior Publication Data
US 2020/0200151 A1 Jun. 25, 2020

Related U.S. Application Data

(60) Provisional application No. 62/549,562, filed on Aug. 24, 2017.

(30) Foreign Application Priority Data

Aug. 30, 2017 (DK) .............................. PA 2017 70650

(51) Int. Cl.
*F03D 80/30* (2016.01)
*E05B 15/16* (2006.01)

(52) U.S. Cl.
CPC .......... *F03D 80/30* (2016.05); *E05B 15/1614* (2013.01)

(58) Field of Classification Search
CPC .............................. F03D 80/30; E05B 15/1614
See application file for complete search history.

(56) References Cited

U.S. PATENT DOCUMENTS 3,659,885 A * 5/1972 Nail .................. E05B 15/10
292/2
4,178,859 A * 12/1979 Seiz .................. E06B 5/16
109/27

(Continued)

FOREIGN PATENT DOCUMENTS

| CN | 105849407 A | 8/2016 |
| CN | 106194611 A | 12/2016 |

(Continued)

OTHER PUBLICATIONS

Kyocera, Types of fine Ceramics and Hardness, Sep. 19, 2015, Fine Ceramics World, (Year: 2015).*

(Continued)

*Primary Examiner* — Woody A Lee, Jr.
*Assistant Examiner* — Wesley Le Fisher
(74) *Attorney, Agent, or Firm* — Wood Herron & Evans LLP

(57) ABSTRACT

A wind turbine rotor blade lightning receptor arrangement (12) is provided with an electrically conductive block (123) and a shielding component (122). In use, the electrically conductive block (123) forms an electrical bridge between a receptor element (121) of a lightning protection system and a down conductor (15) of the lightning protection system. The electrically conductive block (123) comprises a first engagement surface (124) for, in use, receiving the receptor element (121). The shielding component (122) overlays a portion of the first engagement surface (124) of the electri- (Continued)

cally conductive block (123), while leaving open an area for receiving the receptor element (121).

12 Claims, 6 Drawing Sheets

(56) References Cited

U.S. PATENT DOCUMENTS

| | | | | |
|---|---|---|---|---|
| 4,806,168 | A * | 2/1989 | Ivarsson | C04B 28/34 106/644 |
| 5,010,227 | A * | 4/1991 | Todd | B23K 3/047 219/119 |
| 6,541,124 | B1 * | 4/2003 | Suggs | B32B 15/013 109/80 |
| 2009/0257882 | A1 * | 10/2009 | Olsen | F03D 80/30 416/241 B |
| 2016/0201356 | A1 * | 7/2016 | George | E05B 71/00 70/38 R |
| 2016/0245264 | A1 | 8/2016 | Sogaard et al. | |
| 2016/0348652 | A1 * | 12/2016 | March Nomen | F03D 80/30 |
| 2017/0321661 | A1 * | 11/2017 | Mieritz | F03D 80/30 |
| 2018/0094621 | A1 * | 4/2018 | Olsen | F03D 80/30 |

FOREIGN PATENT DOCUMENTS

| | | | |
|---|---|---|---|
| CN | 107076123 A | 8/2017 | |
| DK | 201570797 A1 | 12/2016 | |
| GB | 2468720 A | 9/2010 | |
| WO | 2013182447 A1 | 12/2013 | |
| WO | 2015055214 A1 | 4/2015 | |
| WO | 2015055215 A1 | 4/2015 | |
| WO | WO-2015055215 A1 * | 4/2015 | ........... F03D 1/0675 |
| WO | 2016074677 A1 | 5/2016 | |

OTHER PUBLICATIONS

ElectricAnswerMan, YoutTube video titled: "12" Long Stud Joist "Boca" Nail Plate: SP-512"; Published: Jul. 17, 2014, (Year: 2014).*
Danish Patent and Trademark Office, Search and Examination Report in PA 2017 70650, dated Jan. 30, 2018.
European Patent and Trademark Office, International Search Report and Written Opinion in PCT Application No. PCT/DK2018/050205, dated Oct. 31, 2018.
China National Intellectual Property Administration, First Notification of Office Action in CN Application No. 201880067403.4, dated May 8, 2021.
China National Intellectual Property Administration, Second Notification of Office Action in CN Application No. 201880067403.4, dated Jan. 10, 2022.

* cited by examiner

WIND TURBINE ROTOR BLADE LIGHTNING RECEPTOR ARRANGEMENT

TECHNICAL FIELD

The invention relates to a receptor arrangement of a lightning protection system for use in a wind turbine rotor blade, to a wind turbine rotor blade incorporating a lightning protection system and to a wind turbine with such a rotor blade. The receptor arrangement comprises an electrically conductive block and a shielding component, with the shielding component overlaying a portion of the electrically conductive block.

BACKGROUND OF THE INVENTION

Wind turbines are vulnerable to being struck by lightning; sometimes on the tower, nacelle and the rotor hub, but most commonly on the rotor blades of the turbine. A lightning strike event has the potential to cause physical damage to the turbine blades and also electrical damage to the internal control systems of the wind turbine. Wind turbines are often installed in wide open spaces which makes lightning strikes a common occurrence. Accordingly, in recent years much effort has been made by wind turbine manufacturers to design wind turbines that are able to manage effectively the energy imparted to them during a lightning strike in order to avoid damage to the blade and the cost associated with turbine down-time during blade replacement.

In general, lightning protection systems for wind turbine rotor blades are known. In one example, an electrically conductive lightning receptor element is arranged on an outer surface of the blade to receive a lighting strike. Since the receptor element is electrically conductive, lightning is more likely to attach to the receptor element in preference to the relatively non-conductive material of the blade. The receptor element is connected to a cable or 'down conductor' that extends inside the blade to the root and from there connects via an armature arrangement to a charge transfer route in or past the hub, nacelle and tower towards a ground potential. Such a lightning protection system therefore allows lightning to be channelled from the blade to a ground potential safely, thereby minimising the risk of damage. However, the discrete receptors are relatively complex to install during fabrication of the blade and they leave a significant portion of blade area exposed to a risk of lightning strike. In some lightning protection systems, the outer surface of the rotor blade may be supplied with a foil or mesh of an electrically conductive material to increase the likely area for the lightning to strike the rotor blade surface. The same or similar receptor elements as described above are electrically coupled to the electrically conductive material at the rotor blade surface and enable discharging to the ground.

In WO 2015/055214 A1, a wind turbine rotor blade having a tip receptor arrangement is described. The receptor arrangement includes individual receptor bases that are connected to a down conductor within the wind turbine rotor blade and connected to an external surface of the blade by receptor elements that extend through the wind turbine rotor blade shell. When lightning strikes the rotor blade surface, the charge is transferred to the down conductor via the receptor elements and receptor bases.

According to WO 2015/055214 A1, the receptor elements must be installed after the blade has been manufactured with the receptor arrangement in place. One of the problems associated with this method of fabricating the blade is that the exact positioning of each receptor base relative to the receptor element is very critical. To facilitate installation of the receptor elements, a plurality of holes are drilled through each blade shell and through the receptor bases. Receptor elements are then inserted into each hole to form an electrical connection between the surface of the blade and one of the receptor bases. If these holes do not properly align with the receptor bases, no or an unsatisfactory electrical connection between the receptor elements and the receptor bases will be established. Furthermore, if the down conductor is damaged during drilling, arcing or sparking may occur or a lightning strike may not be correctly conducted.

It is an object of the invention to provide an improved lightning receptor arrangement for a wind turbine rotor blade that facilitates the desired connection between receptor elements and bases.

SUMMARY OF INVENTION

According to the invention, this object is achieved by providing a wind turbine rotor blade lightning receptor arrangement, the receptor arrangement comprising an electrically conductive block and a shielding component. In use, the electrically conductive block forms an electrical bridge between a receptor element of a lightning protection system and a down conductor of the lightning protection system. The electrically conductive block comprises a first engagement surface for, in use, receiving the receptor element. The shielding component overlays a portion of the first engagement surface of the electrically conductive block, while leaving open an area for receiving the receptor element.

The shielding component is particularly beneficial in installation of receptor elements into the blade. The receptor elements require holes drilled through a shell of the blade and the electrically conductive block at the conductive block. However, there are one or more areas of the electrically conductive block that should not be drilled through if a satisfactory connection between the receptor element and the electrically conductive block are to be formed. Thus, by covering the engagement surface of the electrically conductive block using the shielding component, the drill is unable to penetrate the electrically conductive block in these undesirable regions.

In the context of this invention, the term "shielding" refers to mechanical shielding, such that the shielding component acts as an armour plate. The armour plate prevents a drill bit from penetrating the electrically conductive block where the armour plate is placed. It should be noted that in the context of this invention the term "shielding" does not refer to electromagnetic shielding.

Advantageously, the shielding component not only protects the electrically conductive block, but also provides guidance to a drill operator should they strike the shielding component during an attempt to drill a hole. The operator can then adjust the drill position a little bit to ensure that the correct region of the electrically conductive block is drilled through.

A critical link in the lightning discharge path is the connection between the electrically conductive block and the down connector. In order to avoid any damage to this connection during the drilling, the shielding component may further be arranged to at least partially overlay a connection between the electrically conductive block and the down conductor. For example, the electrically conductive block may comprise an internal bore for receiving the down conductor therein and the shielding component is aligned with the bore. In this way, it is ensured that the drilling will not damage the down conductor (if already connected when drilling) and that the receptor element will not enter the bore and/or damage the down conductor. Also, for a proper electrical connection between the receptor element and the electrically conductive block and to provide an as large as possible contact surface between the two, it is preferred that the full hole is in the electrically conductive block only.

Optionally the electrically conductive block comprises a second engagement surface, opposite the first engagement surface, and wherein the shielding component is further arranged to overlay a portion of the second engagement surface. This will allow additional receptor elements to be properly connected to the electrically conductive block from the other rotor blade surface.

Also in order to promote that the full hole that is drilled is inside the electrically conductive block, the shielding component may be configured to overlay an edge region of at least the first engagement surface. Like described before, this will help to further ensure that a proper electrical connection can be established between the receptor element and the electrically conductive block, by providing an as large as possible contact surface between the two. With its edges covered by the shielding component, the first engagement surface may comprise a central region for receiving the receptor element. A plurality of edge regions may surround the central region, while the shielding component is disposed in the edge regions only.

The shielding component may or may not be in direct contact with the electrically conductive block. Optionally, the electrically conductive block and the shielding component are together encapsulated in an electrically insulative material, such as e.g. polyurethane as also used in WO 2015/055214 A1 for this purpose. The insulative material may not only function to prevent undesired electrical coupling with other parts of the rotor blade, but can additionally be used for improving the attachment to and alignment inside the rotor blade.

The shielding component is preferably made of a non-conductive material to ensure that only the electrically conductive block is electrically coupled to the receptor element. The shielding component is preferably made of a material having a hardness of at least 1200 kgf/mm2 and/or at most 2000 kgf/mm2. These upper and lower limits ensure that the shield is hard enough for not allowing the bore to drill through the shielding component, while not being so hard that the bore will be damaged when hitting upon the shield. For example, ceramics, steel or hardened steel may be used for making the shielding component.

Of course, all features described above (and below) in relation to the first engagement surface are equally suitable and useful for the second engagement surface.

According to further aspects of the invention, a rotor blade comprising the above described lightning receptor arrangement and a wind turbine comprising at least one such rotor blade

BRIEF DESCRIPTION OF THE DRAWINGS

For a better understanding of the invention, some embodiments of the invention will now be described with reference to the following drawings, in which.

DETAILED DESCRIPTION

Figure 1:
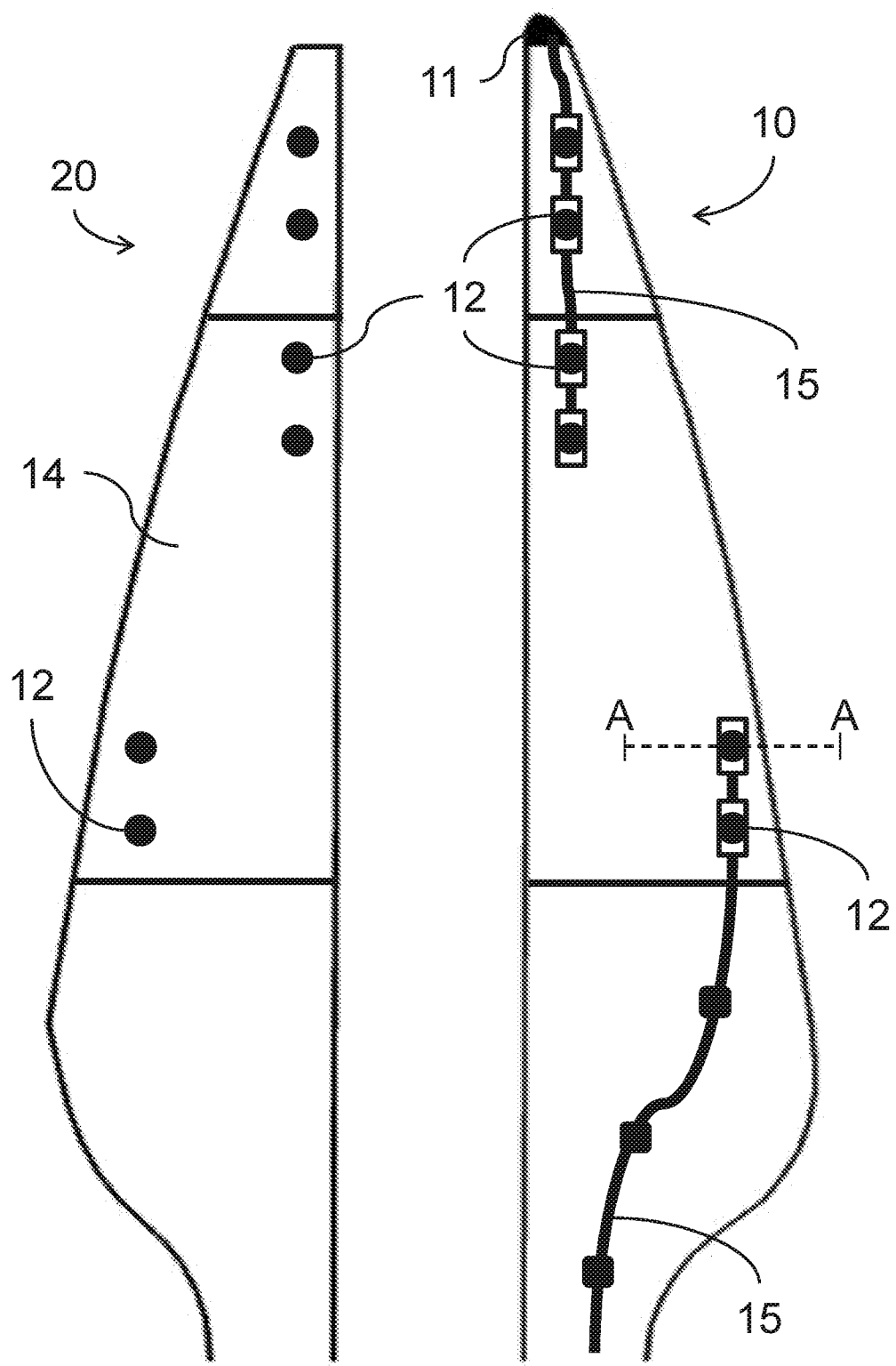
FIG. 1 schematically shows a leeward and a windward shell of a rotor blade.

FIG. 1 schematically shows a leeward and a windward shell 10, 20 of a rotor blade. Rotor blades for wind turbines are usually manufactured using separate moulds for two shells 10, 20 of the blade. In these moulds, the rotor blade is built up layer by layer and additional items or units may be added to the shell surface. When both shells 10, 20 are completed, they are joined together to form a full rotor blade.

One important aspect of a rotor blade for a wind turbine is the lightning protection system that is added to or integrated in the rotor blade surfaces. FIG. 1 schematically shows one example of a lightning protection system, in which the receptor arrangement according to the invention may advantageously be used. This lightning protection comprises a solid metal tip 11 at the distal end of the rotor blade. The solid metal tip 11 acts as a lightning receptor that receives lightning and discharges it to a ground potential via conductors 15 that extend inside the blade, nacelle, and tower of the wind turbine. Solid metal tips 11 therefore allow lightning to be discharged safely and minimise the risk of damage to the wind turbine from lightning strikes. In addition to (or instead of) the solid metal tip 11, multiple lightning receptor units 12 are provided, comprising a receptor element in the form of a lightning bolt and an electrically conductive block, which will hereinafter be referred to as a connector block. The lightning bolts are inserted into the shells 10, 20 and provide for additional conductive surface area for receiving lightning and discharging via the lightning bolt shafts to the connector block which is electrically coupled to the conductors 15 for leading the discharge to the wind turbine tower, and from there to the ground. Preferably the lightning bolts are provided at both the leeward and the windward rotor blade surfaces, but the system can also work when only having lightning bolts installed in one of the shells 10, 20.

As in WO 2015/055216 A1, a surface protective layer 14, which can, e.g., take the form of a mesh or an expanded metal foil, may be provided for conductively interconnecting the lightning bolts, thereby further increasing the surface area capable of receiving and conducting a lightning strike. Like the lightning bolts, also the metallic foil component 14 may be installed at either one or both of the blade shells 10, 20. In this exemplary embodiment, the connector blocks are installed onto the inner surface of the leeward shell 10. When both shells 10, 20 are finally put together, the connector block is preferably also fixed to the inner surface of the windward shell 20. Alternatively, the connector block may be attached to the windward shell 20 first or only. With the protective surface layer 14 being electrically conductive, there is no direct need for a conductor 15 to interconnect all the connector blocks that are already electrically coupled to each other via their respective lightning bolts and the surface protective layer 14. In the embodiment of FIG. 1, for example, there is no conductor provided between the fourth and fifth connector blocks shown in the figure (counted from the blade tip).

Figure 2:
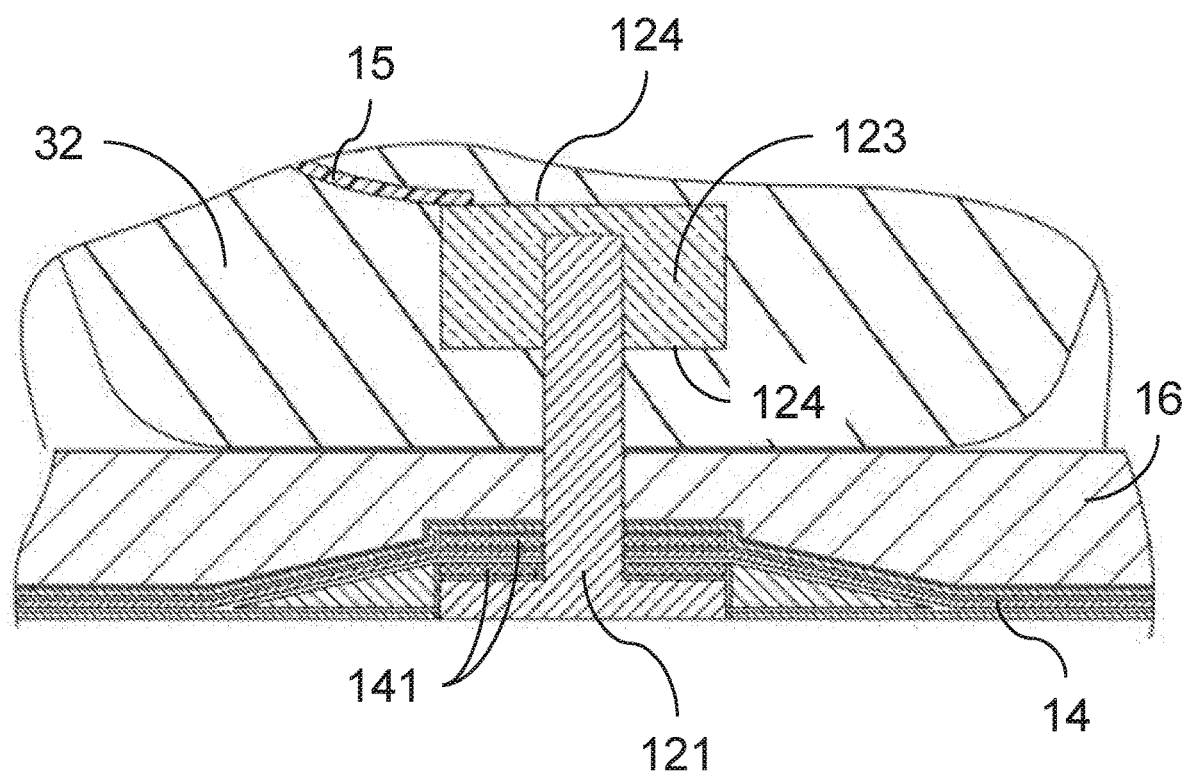
FIG. 2 schematically shows a cross section through the leeward shell of the rotor blade of FIG. 1.

FIG. 2 schematically shows a cross section through the leeward half 10 of the rotor blade of FIG. 1. The cross section is made at the line A-A, indicated in FIG. 1. It is to be noted that this cross section is provided for informational purposes only and has not been draw according to scale. The cross section shows one of the lightning bolts 121. The lightning bolt 121 has a lightning bolt head, preferably being flush with the rotor blade surface, and a lightning bolt shaft. The lightning bolt head serves to conduct the lightning charge via the lightning bolt shaft from the rotor blade surface to the connector block 123. A conductor 15, in the form of a cable, is connected to the connector block 123 for coupling the connector block 123 to other parts of the lightning protection system, such as the solid metal tip 11, another connector block 123 or the down conductor for discharging to the ground.

The rotor blade surface itself is built up out of multiple different layers 14, 16. For this part of the rotor blade surface, the outermost layer is a metallic foil component 14. In this example, the metallic foil component 14 is sandwiched between two layers of glass fibre. In order to fulfil its function as a conductive layer for interconnecting multiple lightning receptor units 12, it is important that the metallic foil component 14 is in electrical contact with the lightning bolts 121. Preferably the larger surface area of the lightning bolt head, and not just a circumferential area of the lightning bolt shaft, is in electrical contact with the metallic foil component 14 in order to provide a reliable and robust electrical connection.

Lightning bolt receptors 141 are provided on the metallic foil component 14 for receiving the lightning bolt 121. In this exemplary embodiment, the lightning bolt receptors 141 comprise two conductive annular discs. Holes in the centre of these discs provide a channel for the lightning bolt 121 to extend through the metallic foil component 14 towards the connector block 123. In FIG. 2, the outer one of the conductive discs is shown to be in contact with the lightning bolt head, which provides for the desired electrical connection between the metallic foil component 14 and the connector block 123. The function of the other disc is mainly to provide additional structural support. In this example, it would therefore not be a problem if the second disc were made of a non-conductive material.

On top of the metallic foil component 14, a set of structural blade components 16 is provided with which the metallic foil component 14 may be integrated during a resin infusion and curing process. The structural blade components 16 may include further fabric layers, foam core sections and the like, as would be known to a person skilled in wind turbine rotor blade design. The connector block 123 is attached, e.g. adhesively bonded, on top of the cured shell. Preferably, the adhesive also functions as an insulating member in order to prevent lightning from striking the connector block 123 directly instead of via the metallic foil component 14 or the lightning bolt 121. The electrically conductive block 123 and the cable 15 are together encapsulated in an electrically insulative material 32, such as e.g. polyurethane.

After the connector block 123 is installed, an operator drills a hole from the outside of the blade into the blade surface and through the lightning bolt receptor 141. The hole extends into the connector block 123 directly which is then provided with a thread. The hole is then used for receiving the lightning bolt 121 and screwing it into the thread. A practical problem for the operator is that the rotor blade surface is not transparent. When attaching the connector block 123 to the rotor blade surface, the operator cannot see the exact position of the lightning bolt receptor 141. When drilling a hole through the lightning bolt receptor 141, the operator cannot see the exact position of the connector block 123. Even when the connector block 123 is perfectly aligned with the lightning bolt receptor 141, drilling under the wrong angle may still cause the drill bit to, partially or completely miss the intended landing spot on the engagement surface 124 of the connector block 123.

Figure 3:
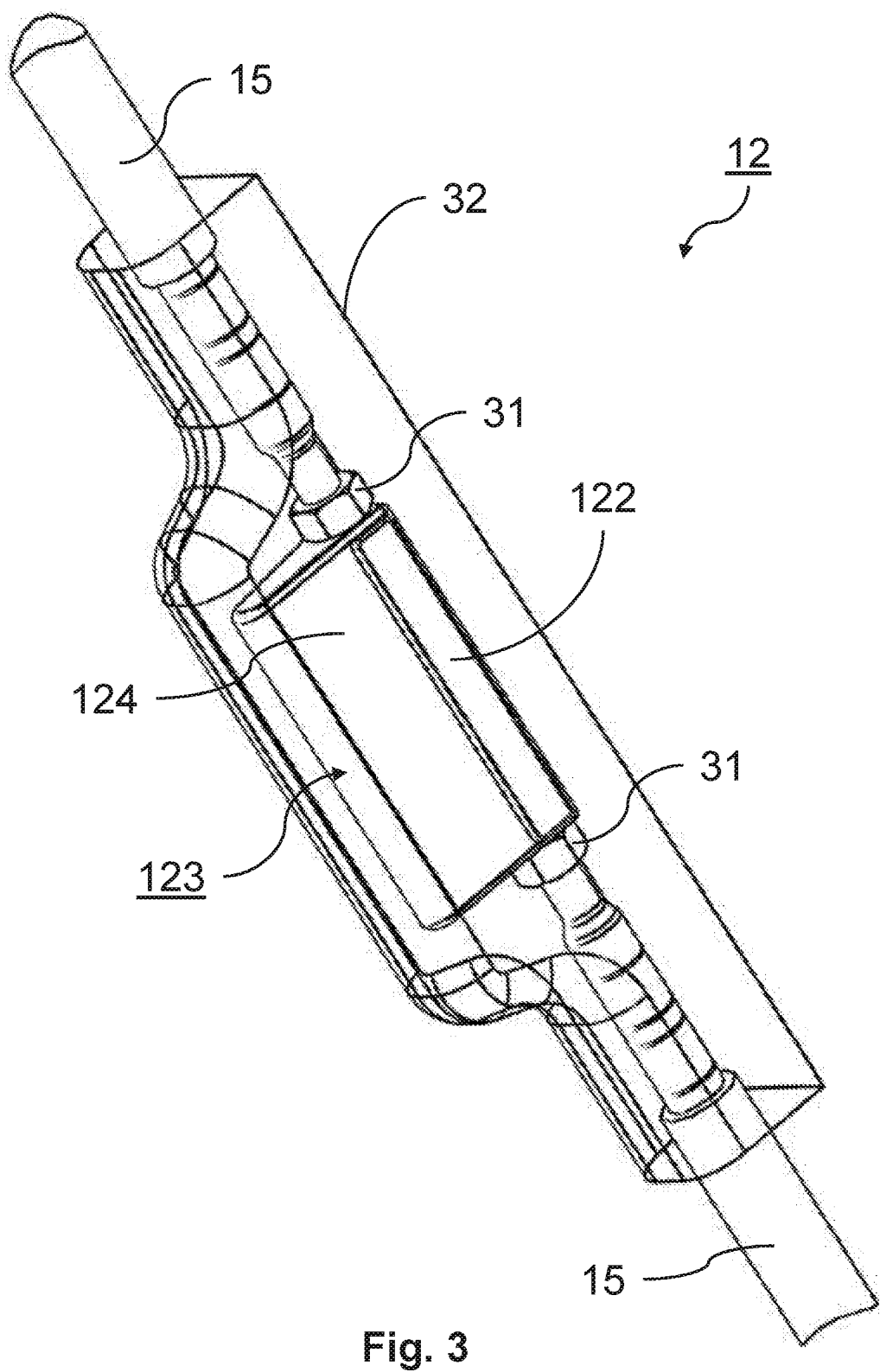
FIG. 3 shows a perspective view on an exemplary receptor arrangement according to the invention.

FIG. 3 shows a perspective view on an exemplary receptor arrangement 12 according to the invention. A core element of the receptor arrangement 12 is the connector block 123 made of an electrically conductive material, such as brass, copper or other metals or metal alloys. An electric cable 15, also called down conductor 15, is connected to the connector block 123, for electrically coupling the connector block to other connector blocks 123, the solid metal tip 11 or other conducting elements of the lightning protection system that eventually will allow for discharging the lightning to the ground. Cable connectors 31 may be provided for firmly connecting the cable 15 to the connector block 123. As can be seen in FIG. 1, most connector blocks 123 have an upstream and a downstream cable connection. Because the connector block 123 itself is electrically conductive, separate cable sections may connect to the upstream or downstream sides of the connector block 123 only. However, for an optimal electrical connection, it is preferred that the cables 15 go deeper into the connector block 123. In this example, an internal bore 125 (see FIGS. 4-6) is provided for receiving the upstream and downstream cable ends, which meet somewhere in the middle of the bore 125. Alternatively, one longer cable 15 may run completely through the internal bore in the connector block 123, but this requires the connector block 123 to be constructed in two separate pieces that are joined together to surround the cable 15. At least inside the internal bore, the cable 15 is stripped from its electrically insulating layers for allowing direct electrical contact between the cable 15 and the conductive material of the connector block 123. A tight fit of the cable 15 inside the bore 125 can further assist in obtaining a reliable electrical connection. When separate cables 15 enter the connector block 123 from each site, a tight fit may be obtained by screw fitting the cables 15 into the bore 125.

On top of the (in this picture) upper surface of the connector block 123, an armour plate 122 is provided. The armour plate 122 functions as a shielding component, protecting the internal bore 125 and the cable 15 provided therein from being damaged when drilling the holes for the lightning bolts 121. The armour plate is made of a hard material, preferably with a hardness between 1200 and 2000 kgf/mm$^2$ (11.8-19.6 GPa), measured using ASTM C1327-15 (Standard Test Method for Vickers Indentation Hardness of Advanced Ceramics). For example a ceramic with a Vickers hardness of 1650 kgf/mm$^2$ (16.2 GPa) may be used. For effective shielding of the connector block 123 and the relevant functional parts associated therewith, it is necessary that the armour plate 122 is harder than the drill bit that is used for drilling the holes. With the above mentioned Vickers hardness values, this is expected to be the case for most generally used drill bits. The armour plate 122 may have a thickness of about 0.5 mm, but thicker armour plates can also be used. The armour plate 122 is preferably non-conductive in order to avoid arcing problems and electrical erosion. An exemplary ceramic material that will be suitable for use in the armour plate 122 is aluminium silicate. In other examples, the armour plate may be formed from hardened steel.

The electrically conductive block 123, the shielding component 122 and the cable connectors 31 are together encapsulated in an electrically insulative material 32, such as e.g.

polyurethane. The insulative material 32 may not only function to prevent undesired electrical coupling with other parts of the rotor blade, but can additionally be used for improving the attachment to and alignment inside the rotor blade.

Figure 4:
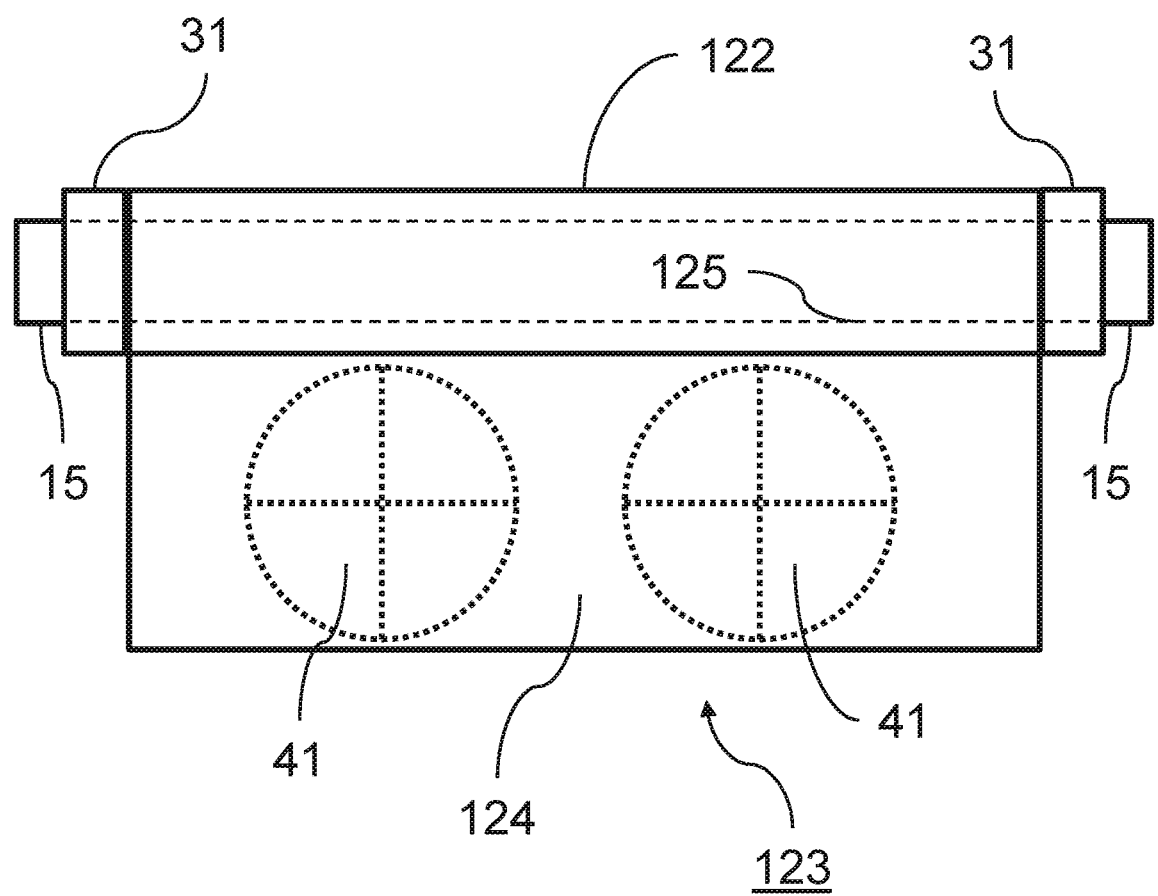
FIG. 4 schematically shows a top view of part of the receptor arrangement of FIG. 3.

FIG. 4 schematically shows a top view of part of the receptor arrangement 12 of FIG. 3. In this figure, no insulative material 32 is shown for simplicity. Apart from the features already shown in and described with reference to FIG. 3, here also the internal bore 125 is indicated (in dotted lines). The top surface of the connector block 123 is the surface that will face the rotor blade inner surface and thus is the surface that will be engaged by the drill bit when drilling the hole or holes through the rotor blade into the connector block 123. The preferred regions 41 for drilling the holes into are indicated on the engagement surface 124 with dotted lines. When a drill bit hits the armour plate 122, the operator will notice that he is drilling in the wrong location and can reposition the drill bit for a new attempt. In the event that lightning bolts 121 will also be connected to this connector block 123 from the opposite rotor blade surface, a similar or identical armour plate 122 may be attached at the corresponding position on the bottom surface of the connector block 123.

Figure 5:
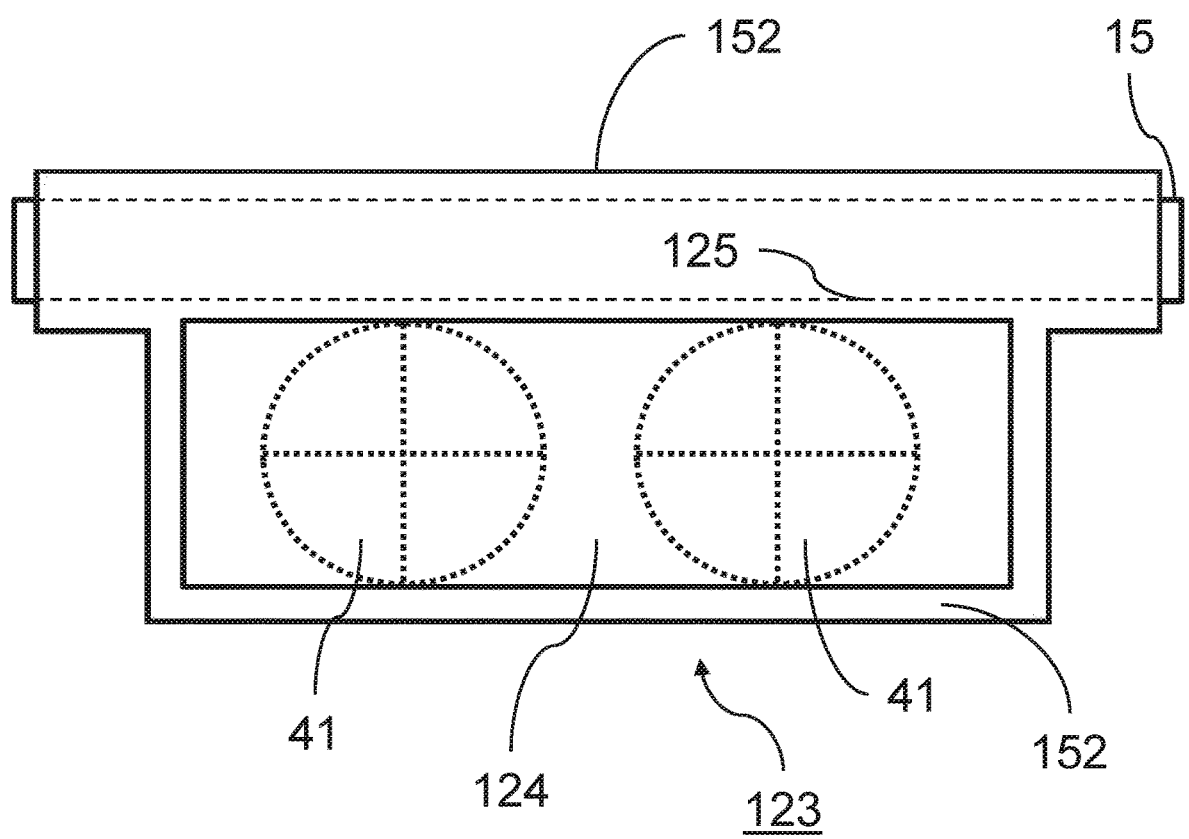
FIG. 5 schematically shows a top view of part of a second exemplary receptor arrangement according to the invention.

FIG. 5 schematically shows a top view of part of a second exemplary receptor arrangement 12 according to the invention. Compared to the embodiment shown in FIGS. 3 and 4, the armour plate 152 in this embodiment also covers, and therewith protects, the cable connectors and the edges of the connector block 123. Although the armour plate 152 is shown to be made out of one piece, similar shielding can of course be obtained using multiple shielding parts. An important advantage of shielding the connector block edges is that it ensures that the holes that are drilled fall completely inside the connector block 123 and allow for a firm attachment of the lightning bolt 121. Shielding the cable connectors has the same advantage and additionally protects the cable connectors from being damaged by the drilling.

In the event that lightning bolts 121 will also be connected to this connector block 123 from the opposite rotor blade surface, a similar or identical armour plate 152 may be attached at the corresponding position on the bottom surface of the connector block 123.

Figure 6:
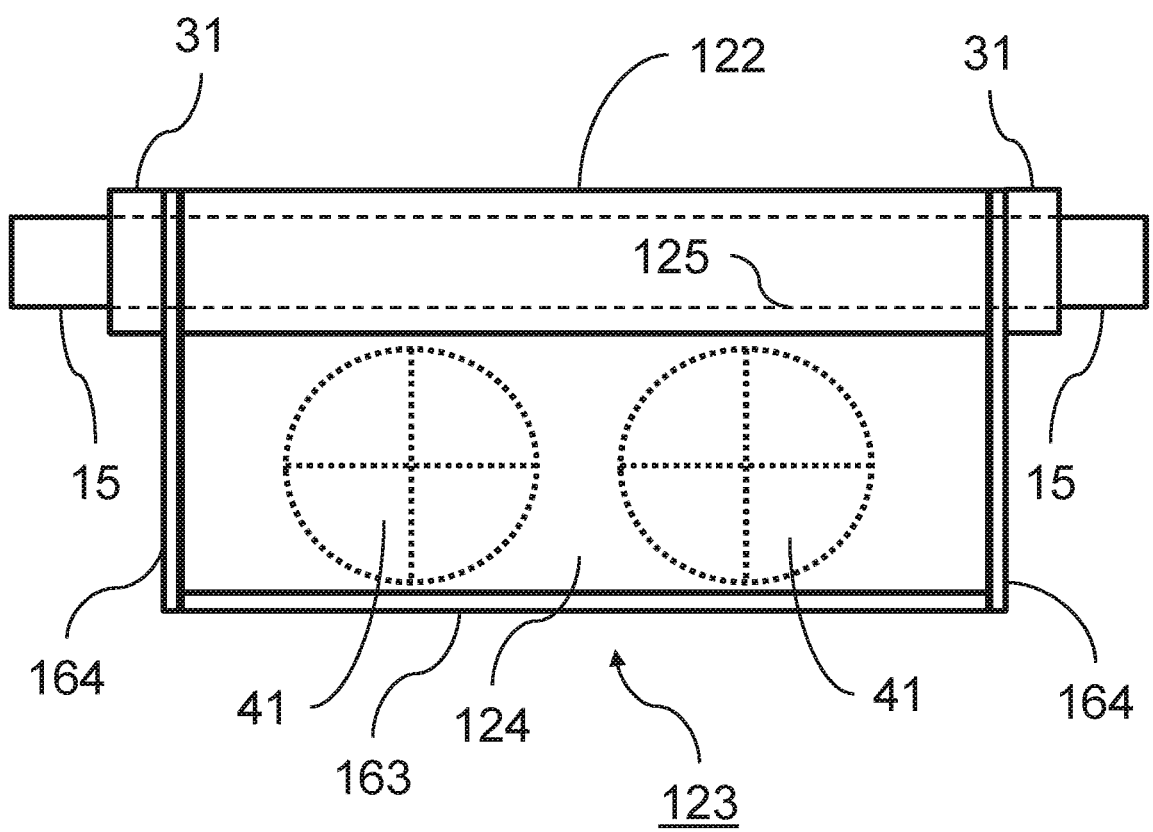
FIG. 6 schematically shows a top view of part of a third exemplary receptor arrangement according to the invention.

FIG. 6 schematically shows a top view of part of a third exemplary receptor arrangement 12 according to the invention. The main armour plate 122 in this example is either similar or identical to the armour plate 122 of FIG. 3. In addition thereto, a front armour plate 163 and two side armour plates 164 of the same or a similar material as the main armour plate 122, are attached to the front and side surfaces of the connector block 123. The front and side armour plates 163, 164 may, e.g., be simple flat plates that cover the front and side surfaces of the connector block 123 only, or they may have an L- or U-profile for also covering part of the upper and/or bottom surface of the connector block 123. Like before, if lightning bolts 121 are also connected to this connector block 123 from the opposite rotor blade surface, a similar or identical armour plate 122 may be attached at the corresponding position on the bottom surface of the connector block 123.

The invention claimed is:

1. A wind turbine rotor blade lightning receptor arrangement, the receptor arrangement comprising:
    an electrically conductive block that, in use, forms an electrical bridge between a receptor element of a lightning protection system and a down conductor of the lightning protection system, the electrically conductive block comprising a first engagement surface for, in use, receiving the receptor element, and
    a shielding component, overlaying a portion of the first engagement surface of the electrically conductive block, while leaving open an area for receiving the receptor element,
    wherein the shielding component is in the form of an armour plate attached to the first engagement surface and arranged such that, in use, the receptor element does not extend through the armour plate,
    wherein the shielding component is further arranged to at least partially overlay a connection between the electrically conductive block and the down conductor, and
    wherein the electrically conductive block comprises an internal bore for receiving the down conductor therein, and the shielding component is aligned with the internal bore.

2. The wind turbine rotor blade lightning receptor arrangement of claim 1, wherein the electrically conductive block comprises a second engagement surface, opposite the first engagement surface, and wherein the shielding component is further arranged to overlay a portion of the second engagement surface.

3. The wind turbine rotor blade lightning receptor arrangement of claim 1, wherein the shielding component is configured to overlay an edge region of at least the first engagement surface.

4. The wind turbine rotor blade lightning receptor arrangement of claim 3, wherein the first engagement surface comprises a central region for receiving the receptor element and a plurality of edge regions surrounding the central region, and wherein the shielding component is disposed in the edge regions only.

5. The wind turbine rotor blade lightning receptor arrangement of claim 1, wherein the electrically conductive block and the shielding component are together encapsulated in an electrically insulative material.

6. The wind turbine rotor blade lightning receptor arrangement of claim 1, wherein the shielding component is made of a non-conductive material.

7. The wind turbine rotor blade lightning receptor arrangement of claim 1, wherein the shielding component is made of a material having a hardness of at least 1200 kgf/mm$^2$.

8. The wind turbine rotor blade lightning receptor arrangement of claim 1, wherein the shielding component is made of a material having a hardness of at most 2000 kgf/mm$^2$.

9. The wind turbine rotor blade lightning receptor arrangement of claim 1, wherein the shielding component is made of a ceramic.

10. The wind turbine rotor blade lightning receptor arrangement of claim 1, wherein the shielding component is made of aluminum silicate.

11. A wind turbine rotor blade, comprising:
    a blade shell defining an outer surface and an interior;
    a lightning protection system including a down conductor extending along the interior of the blade shell and at least one receptor arrangement, the at least one receptor arrangement comprising:
        a receptor element extending from the outer surface to the interior of the blade shell;
        an electrically conductive block in the interior of the blade shell and including a first engagement surface that receives the receptor element; and a shielding component, overlaying a portion of the first engagement surface of the electrically conductive block, while leaving open an area for receiving the receptor element, wherein the electrical conductive block forms an electrical bridge between the receptor element and the down conductor, wherein the shielding component is in the form of an armour plate attached to the first engagement surface and arranged such that the receptor element does not extend through the armour plate, wherein the shielding component is further arranged to at least partially overlay a connection between the electrically conductive block and the down conductor, and wherein the electrically conductive block comprises an internal bore for receiving the down conductor therein, and the shielding component is aligned with the internal bore.

12. A wind turbine comprising the wind turbine rotor blade according to claim 11.

\* \* \* \* \*